United States Patent Office 3,810,933
Patented May 14, 1974

3,810,933
BIS(3-CHLORO-4-HYDROXYPHENYL)
MALONONITRILE
Eugene G. Banucci, Scotia, N.Y., assignor to General
Electric Company, Schenectady, N.Y.
No Drawing. Filed May 30, 1972, Ser. No. 257,637
Int. Cl. C07c *121/74*
U.S. Cl. 260—465 F                     1 Claim

ABSTRACT OF THE DISCLOSURE

The compound bis(3-chloro-4-hydroxyphenyl) malononitrile and a method for making the same based on the reaction of 2-chlorophenol and pyruvonitrile are described. This compound can be reacted with diacyl halides or with diphenyl carbonate or phosgene to form polyester resins useful in molding and film-forming applications.

This invention is concerned with novel cyano bisphenol derivatives and methods for preparing the same. More particularly, the invention relates to compounds having the general formula I 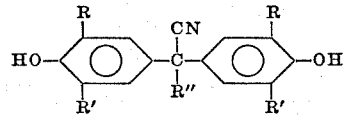

and methods for preparing the same obtained by effecting reaction, in the presence of a substantially anhydrous acidic condensing agent, for example, sulfuric acid, polyphosphoric acid, etc., between an electron rich aromatic compound of the general formula II 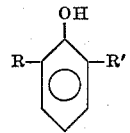

and a nitrile of the general formula

III 

where R and R' can be the same or different members selected from the class consisting of hydrogen, alkyl radicals of from 1 to 4 carbon atoms, the phenyl radical, and halogen (e.g., chlorine, bromine, fluorine, etc.), with the proviso that R and R' can not be a halogen at the same time, and R" is selected from the class consisting of alkyl radicals of from 1 to 4 carbon atoms and the cyano group.

The condensation of aromatic acyl cyanides with aromatic compounds is well known as is disclosed in British Pat. 861,372, issued Feb. 22, 1961; the aromatic substituted bisphenols thus obtained have been converted to polymers to form polycarbonate resins as more particularly disclosed in the book of H. Schnell "Chemistry and Physics of Polycarbonates," published by J. Wiley and Sons, New York, N.Y. (1964), page 67. However, when one considered reacting alkyl acyl cyanides with the same aromatic compounds, it was previously thought that the aromatic compounds were acylated in the same manner as would happen using acid halides because of the lack of any aromatic stabilizing influence on the carbonyl.

Unexpectedly, I have found that nitriles such as carbonyl cyanide or pyruvonitrile, can be reacted with aromatic compounds of the type described above to form cyano-alkyl bisphenols provided one employs, for reaction purposes an acidic anhydrous agent. In addition, it is important in the practice of my invention that any water which is formed as a result of the interaction of the reactants, is promptly tied up by means of the acidic condensing agent which is accordingly substantially anhydrous for the purpose. The further use of an additional anhydrous material, such as glacial acetic acid with, for instance, the sulfuric acid, enhances the ease of condensation and gives better yields of the desired product. The use of gaseous concentrated HCl on the other hand was found to cause acetylation, for instance, between phenol and pyruvonitrile to yield the product

Among the alkyl radicals which R and R' can be are, for instance, methyl, ethyl, propyl, isopropyl, butyl, etc.

Included among the aromatic compounds of Formula II which may be employed in the practice of the present invention may be mentioned, for example, phenol, orthocresol, 2-ethylphenol, 2,6-xylenol, 2,6-di-t-butylphenol, 2-chlorophenol, 2,6-diphenylphenol, 2-bromophenol, 2-methyl-6-chlorophenol, 2-bromo-6-methylphenol, 2-phenylphenol, 2-methyl-6-phenylphenol, 2 - chloro-6-phenylphenol, etc.

Included among the nitriles of Formula III are, for instance, carbonyl cyanide, pyruvonitrile (2-oxopropanenitrile), 2-oxo-butanenitrile, 2-oxo-pentanenitrile, 2-oxohexanenitrile, 2-oxo-isobutylnitrile, etc.

The reaction between the phenolic compound and the nitrile can be carried out in any manner which is convenient for the purpose. Generally, I have found that a solvent which is inert to the reactants and to the reaction products is advantageously employed for the purpose. Included among such solvents (whose concentration is not critical and can be varied widely) may be mentioned glacial acetic acid in combination with the sulfuric acid, hexane when used with the polyphosphoric acid, nitrobenzene, etc. In some instances, a solvent may not be required, although generally improved yields are derived by use of a solvent, particularly one which is capable of adding to the rate of removal of water formed in the reaction. The use of thiols, such as β-mercaptothiopropionic acid, dodecyl mercaptan, etc., in amounts ranging from about 0.001 to 1 mol percent, based on the molar concentration of the nitrile, helped to optimize the reaction in some instances and improve the yields.

The anhydrous acidic agent is advantageously present in a molar concentration of at least one mole of the acid, to as high as five or more mols thereof, per mol of the nitrile.

Generally, the nitrile and the aromatic compound are mixed together in such molar ratios that the aromatic compound is in a molar excess over the nitrile. Advantageously, I have found that I can employ from about 2 to 8 or more mols of the aromatic compound per mol of the nitrile.

After the reactants are mixed together, the acidic agent and any solvent or catalyst are added and the reaction mixture advantageously cooled to below room temperature, for example, from 0° to 30° C., and mixing of the ingredients is carried out until the reaction is completed. The reaction between the ingredients is ordinarily quite rapid and usually times of from a few minutes to about one hour are required. The reaction is ordinarily exothermic so that it is desirable to effect cooling of the reaction mixture. However, slight heating at temperatures from about 35° to 45° C., to accelerate the reaction, can be employed under some conditions depending upon the reactants used, the concentration and kind of acidic agent, etc. After the reaction is completed, the reaction product is subjected to the usual extraction and distillation to isolate the desired cyano bisphenol.

In order that those skilled in the art may better understand how the present invention may be practiced, the following examples are given by way of illustration and not by way of limitation.

EXAMPLE 1

About 70.5 grams (0.75 mol) freshly distilled phenol was placed in a reaction vessel equipped with a stirrer, nitrogen inlet and dropping funnel. After purging the reaction vessel with nitrogen, 60 ml. glacial acetic acid (99.9%) was added to dissolve the phenol and the solution was then cooled to 0° C. While stirring the mixture, 10 ml. of concentrated sulfuric acid (96.3%) was added, and then 10 grams (0.125 mol) carbonyl cyanide was added. After cooling to 25° C., a white crystalline product separated out. The solution was poured into aqueous sodium bicarbonate and extracted three times with diethyl ether. The ether extracts were washed with brine, dried with magnesium sulfate and concentrated. The residue crystallized on standing and when isolated, gave a white solid in an amount equal to 30.6 grams (98% yield) having a melting point of 145–147° C. The identity of the compound as being dicyano - bis(4 - hydroxyphenyl) methane (4,4' - dihydroxydiphenylmalononitrile) was established by NMR, infra-red, mass spectrometry, and by the following elemental analyses.—Found (percent): C, 72.0; H, 4.2; N, 11.2. Calculated (percent): C, 72.0; H, 4.0; N, 11.2.

EXAMPLE 2

Employing a similar procedure as in Example 1, 31.2 grams (0.452 mol) pyruvonitrile was condensed with 174.0 grams (1.85 mol) phenol using 60 grams of polyphosphoric acid as a catalyst with 100 ml. hexane. This resulted in a yield of about 54% of the desired product as determined by gas chromatographic analysis. After recrystallization of the precipitated product from a mixture of diethyl ether and benzene, a white solid was obtained having a melting point of 168–170° C. As a result of identification by infrared and by nmr as well as by elemental analyses, it was determined that the compound was 4,4'-(1-cyanoethylidene)bisphenol. The elemental analyses were as follows.—Found (percent): C, 75.4; H, 5.6; N, 5.6. Calculated (percent): C, 75.3; H, 5.4; N, 5.8.

EXAMPLE 3

Employing the same conditions as were employed in Example 1, carbonyl cyanide and pyruvonitrile were reacted with various aromatic compounds employing different anhydrous acidic agents and employing as a catalyst, in all instances, β-mercapto-thiopropionic acid, in an amount equal to about 0.005 mol percent of the molar concentration of the nitrile. The aromatic compound was used in a molar ratio of at least 2.7 mols thereof per mol of the nitrile. The following Table I shows the ingredients used, the conditions, as well as the yield of the bisadduct in each instance. Table II shows the bisadduct products formed from the reactions of Table I.

TABLE I

| Test No. | Aromatic compound | Cyanide | Acidic agent * | Temperature, °C. | Solvent | Percent yield of main bisadduct |
|---|---|---|---|---|---|---|
| 1 | Phenol | CH₃COCN | Polyphosphoric acid | 40 | Hexane | 34 |
| 2 | do | CH₃COCN | H₂SO₄ | 15 | None | 28 |
| 3 | do | NCCOCN | H₂SO₄ | 15 | Nitrobenzene | 68 |
| 4 | do | NCCOCN | H₂SO₄ | 15 | Glacial acetic acid | 95 |
| 5 | 2,6-dimethyl phenol | NCCOCN | H₂SO₄ | 15 | do | 98 |
| 6 | 2-phenylphenol | NCCOCN | H₂SO₄ | 15 | do | 94 |
| 7 | 2-chlorophenol | NCCOCN | H₂SO₄ | 15 | do | 89 |

* The sulfuric acid was concentrated, 96.3%.

TABLE II

Test No.:
1 —————— 4,4'-(1-cyanoethylidene)bisphenol.
2 —————— Same as 1.
3 —————— 4,4'-dihydroxydiphenylmalononitrile.
4 —————— Same as 3.
5 —————— Bis(3,5-dimethyl -4 - hydroxyphenyl)-malononitrile.
6 —————— Bis(3-phenyl - 4 - hydroxyphenyl)-malononitrile.
7 —————— Bis(3 - chloro - 4 - hydroxyphenyl)-malononitrile.

It will of course be apparent to those skilled in the art that in addition to the cyanides and aromatic compounds employed in the foregoing examples, other cyanides and aromatic compounds, many examples which have been given previously, may be employed without departing from the scope of the invention. In addition, other suitable anhydrous acidic agents and other solvents may be used within the scope of the invention; the conditions of reaction may be materially changed as was pointed out earlier if desired.

The compositions obtained in accordance with the practice of the invention have many uses. In particular, the biphenols made from the mononitrile or dinitrile may be employed as intermediates in the preparation of various polymeric compositions. For instance, the biphenols herein described can be reacted with various polycarboxylic acids or anhydrides such as, for instance, terephthalic acid, isophthalic acid, adipic acid, etc., to form polyester resins which have utility as fibers, films or as molded products. In addition, the above-described biphenols can be reacted with various materials capable of forming polycarbonate resins, for instance, phosgene, diphenyl carbonate, etc. Such polycarbonate resins also have utility in the molding and coating arts. Specific uses for such fibers, films, and molded products include filaments for making various textiles, films for protective or insulating purposes, and molded parts which can be used for making gears, light shields, etc. Polyester resins (which term includes polycarbonate resins) are more particularly disclosed and claimed in my copending application Ser. No. 257,541, now abandoned, filed concurrently herewith and assigned to the same assignee as the present invention.

What I claim as new and desire to secure by Letters Patent of the United States is:

1. The compound bis(3 - chloro - 4 - hydroxyphenyl) malononitrile.

References Cited

FOREIGN PATENTS 861,372  2/1961  Great Britain.

OTHER REFERENCES

Takimoto et al.: J. Org. Chem., vol. 29, pp. 1899–1902 (1964).

Schraufstaetter: Chemical Abstracts, vol. 60, p. 2862 (1964).

LEWIS GOTTS, Primary Examiner

D. H. TORRENCE, Assistant Examiner

U.S. Cl. X.R.

260—47 R, 47 XA